United States Patent [19]

Raaness et al.

[11] 4,289,949

[45] Sep. 15, 1981

[54] PLASMA BURNERS

[75] Inventors: Ola S. Raaness, Saupstad; Jon A. Bakken, Trondheim, both of Norway

[73] Assignee: SINTEF (Selskapet for Industriell og Teknisk Forskning ved NTH), Trondheim, Norway

[21] Appl. No.: 46,023

[22] Filed: Jun. 6, 1979

[51] Int. Cl.$^3$ .............................................. B23K 9/00
[52] U.S. Cl. ........................ 219/121 PR; 219/121 P; 219/76.16; 219/145.1
[58] Field of Search .................. 219/121 P, 121 R, 74, 219/145.1, 75, 137 R, 73.1, 69 E, 68; 315/111.1; 313/231.3, 231.4, 231.5, 231.6; 148/9 R

[56] References Cited

U.S. PATENT DOCUMENTS

| | | | |
|---|---|---|---|
| 3,270,178 | 8/1966 | Keller | 219/74 |
| 3,407,281 | 10/1968 | Greene et al. | 219/74 X |
| 3,615,924 | 10/1971 | Swoboda | 219/121 P |
| 3,626,147 | 12/1971 | Sato | 219/74 |
| 3,748,434 | 7/1973 | Girard | 219/145.1 |
| 4,147,916 | 4/1979 | Fairbairn | 219/121 P |

FOREIGN PATENT DOCUMENTS 1018631  1/1966  United Kingdom ............ 219/121 P

*Primary Examiner*—Gene Z. Rubinson
*Assistant Examiner*—M. Paschall

[57] ABSTRACT

Plasma burner provided with an electrode holder for the support of a centrally arranged electrode and an outer electrode, a device for applying an electrical voltage for producing an electric arc between the electrodes and a device for the supply of gas to the electric arc area of the electrodes. The electrodes constitute a continuously consumable electrode system in which the outer electrode has the shape of a pipe while the other electrode is pipe- or rod-shaped and coaxially arranged within the outer electrode so as to define therebetween a passage of annular cross-section. The electrode holder is designed to conduct gas through the passage forwards to a front, free end of the electrodes where the electric discharge occurs from the end of the inner electrode.

8 Claims, 4 Drawing Figures

PLASMA BURNERS

BACKGROUND OF THE INVENTION

1. Field of the Invention

This invention relates to plasma burners.

2. Description of the Prior Art

Plasma burners are utilised in a series of areas for such purposes as the rapid heating of surfaces, melting of materials, heating of solid and liquid materials and conducting chemical reactions at temperatures above those which can be obtained conveniently by other types of heating. The heating occurs mainly by heat rays from the very hot gas components of the plasma flame which are absorbed on the surface of the body which is desired to be heated.

The application of dissimilar types of plasma burners of dissimilar materials for purposes such as burning and melting and other types of heating is well known. A common feature for all these different types of plasma burners is that for any of the parts which the burner is constructed of, there must be avoided, to a substantial degree, any change in shape during operation as a consequence of melting or vaporising. The reason for avoiding a change is that the electrical characteristics of the burner are thereby altered. This arises in that the parts of the burner which are supplied with heat from the plasma flame are cooled. The heat is often led away from these parts by means of a cooling medium (fluid or gas) which flows in ducts in the heat-stressed part of the burner. Perspiration cooling can also be employed. In order to create cooling, the designers of this type of plasma burner have been forced in part to use packings and materials which do not tolerate heating to high temperatures. If an electrically conducting material forces itself into the burner due to a failure and creates an electrical contact between inner and outer electrodes, often called "dysen" (the jet), the short circuit which occurs will often be sufficient to destroy the burner.

It has not been possible, therefore, to utilise the types of burners which have been known hitherto in intensely aggressive environments and at high temperatures, nor submerged in electrically conducting metal, slag or salt melts.

By virtue of the complex construction of the plasma burners known hitherto and the demands which have been placed on the plasma electrodes in these burners, it has been necessary to avoid contact between parts of the plasma burner and metals, slag and salt melts which are kept at high temperatures. This has meant that the designers have not been able to place the plasma burner in contact with the medium which is to be heated. When the designer has elected to place the plasma burner far from the object which is to be heated, this involves a loss of energy in the transfer of heat from the plasma flame. In those cases where the designer has taken the risk of placing the burner, for example, close to a liquid phase, the result has been an undesired local overheating and with this a consequent undesired vaporising of the material which is to be heated.

SUMMARY OF THE INVENTION

The main object of the invention is to create a plasma burner which can be used under conditions where hitherto it has not been techically possible to employ known plasma burners by virtue of their construction and the materials which they are made of.

It is a further object to create a plasma burner which avoids the introduction of a cooling medium in the burner. The plasma burner according to the invention must be able to burn with the electrodes and the plasma flame submerged in a melt.

If, due to a failure or an operational interruption, the melted material is forced into the intermediate space between the electrodes so that a short circuit occurs, this will not involve permanent changes to the properties of the plasma burner.

According to the present invention a plasma burner comprises a centrally arranged electrode, an outer electrode and an electrode holder for the support of said electrodes, means for applying an electrical voltage for producing an electric arc between the electrodes and means for the supply of gas to the electric arc area of said electrodes, the electrodes constituting a continuously consumable system in which said outer electrode has the shape of a pipe and said centrally arranged electrode has a shape selected from that of a rod and a pipe and is coaxially arranged within said outer electrode so as to define therebetween a passage of annular cross-section, and said electrode holder being designed to conduct gas through said passage forwards to a front, free end of the electrodes where the electric discharge occurs from the end of said inner electrode.

The electrode system, which consists of an inner rod- or pipe-shaped electrode and an outer pipe-shaped electrode, is thus not provided with any form of internal cooling with water or other cooling materials. The invention is substantially distinguished on this point from previously known, more complicated constructions based on water-cooled and, in principle, non-consumable metallic electrodes.

The radial dimensions of each of the electrodes are further adapted so that the eating away of the electrodes caused by the development of heat in the electric arc occurs at the same speed in the axial direction for both the electrodes so that the electrical and gas-dynamic operational conditions and with this the heating effect and the blowing effect (the impulse) of the outwardly flowing gas is not altered substantially as a consequence of the consumption of the electrode.

The coaxial electrodes are mounted in a suitable electrode holder with means for coupling electric current, supplying gas to the hollow space between the electrodes and usually also water for cooling the electrode holder itself.

In principle, there is no limit as to how long the electrodes can be, assuming that the available voltage is high enough to cover the ohmic voltage loss along the electrodes. In order to ensure good centering of the relatively long electrode rods, it can be necessary to support these by means of conveniently distributed spacers, which preferably ought to be made of high melting, electrically insulating materials.

An advantageous property of the plasma burners of the invention is that the open end of the electrode system, where the electric arc burns, develops by itself a natural and stable form after a running-in period of short duration. Both the rod and pipe electrode can in practice, therefore, possibly be cut off straight at the start. The present invention also distinguishes itself on this point conclusively from known constructions where the electrical and gas-dynamic conditions and with this the use properties for these, are critically dependent upon the exact design of the electrodes as well as the other parts of the plasma burner.

Plasma burners according to the invention can, in addition to chemically neutral gases, such as argon, helium and nitrogen, also work with gases and gas mixtures which react chemically with the electrode material at high temperatures, for example, air or hydrogen in combination with graphite electrodes, or which undergo chemical changes, if it is desired to obtain a special effect by using chemically active gases. The chemical electrode degradation which follows from this, which comes in addition to the unavoidable eating away which is due to the electric arc itself, does not reduce the characteristic ability of the burner to function stably, independently of reducing the electrode length.

If desired, the gas can be added to finely divided solid or liquid material in order to obtain an intended chemical reaction with substances in the environment of the burner, the object being, for example, to remove contaminants from a metal melt (refining) or to reduce the melting point of a material which is to be melted by adding a flux.

The plasma burner can very readily be ignited by producing a short circuit of short duration by introducing graphite felt, steel wool, a metal fiber or the like in the opening between the electrodes. In contrast to the metal electrodes which are used in known burners, graphite electrodes are, for example, not damaged by virtue of local melting of the surface as a consequence of the short circuit. The plasma burners according to the invention can also be started by lowering down into an electrically conducting melt, for example, metal. It is thus not necessary to use expensive special equipment for igniting the burner.

With the idea of rough handling, in industrial applications greater mechanical strength can be obtained without having to increase the thickness of the material in that the pipe electrode which is most exposed to external influences, is protected by a relatively thin-walled jacket (pipe) of a suitable metallic material, for example, heat-resistant steel, which during the operation gradually melts away without disturbing the electrical conditions so that the development of energy in the plasma burner is not altered.

Such a metal pipe around the outer electrode will obviously also be able to reduce the eating away of the carbon from the outer side of the electrode as a consequence of oxidation or other chemical attack.

It is known that the total voltage drop over a plasma burner will be dependent upon under which physical conditions the electrical plasma discharge occurs.

In certain circumstances, the material of the electrodes of the plasma burner according to the invention will be able to react with the fluid which the electrodes are submerged in. If such electrodes made of graphite are lowered into liquid steel, one will get in unfavorable cases an undesirable reaction between the graphite and the steel due to the carbon being dissolved in the melt. This type of dissolution reaction can be prevented or the speed of dissolution of the carbon from the outer electrode to the bath can be reduced to an acceptable level by covering the surface of the outer electrode with an oxidic fire-resistant material which is eaten away in step with the electrode. Such oxidic materials are known in the art under the proprietary names "Gun Clay", "Gunmix", "Uniguncast-S", "Trimrecast", "Durax 1600" or "H44".

A plasma burner according to the invention can operate with both direct and alternating current. In the same way as for other gas discharge systems, current sources ought to be used with markedly falling current-voltage characteristics, and the no-load voltage of the current source ought to be higher than the normal burning voltage of the burner.

In tests where a plasma burner according to the invention was employed for heating a metal melt and where the electrode system (in this case graphite) was submerged in the melt, it has been found that the voltage and with this the energy increased unexpectedly when the rod electrode was drawn back somewhat relative to the pipe electrode so that the axial distance between the end faces of the electrodes was substantially greater than the radical distance between the electrodes. The explanation for this phenomenon is considered to be as follows:

If the electrodes are equally long, the electric arc will burn from the rod electrode to the bottom of the gas-filled hollow space which occurs below the open end of the electrode system, the current then returning via the metal melt to the outer electrode. By reason of heavy vaporising of metal in the contact surface of the electric arc with the melt, the electric arc will burn in an atmosphere having a high concentration of easily ionisable metal vapor which gives a significantly lower voltage than when the electric arc burns in an atmosphere of supplied gas, for example, nitrogen, and vaporised electrode material, for example, carbon vapor. This is apparently the case if the rod electrode is drawn sufficiently far back relative to the pipe electrode. An advantage of plasma burners according to the invention where the electrodes burn submerged in a melt, is thus that by adjusting the position of the rod electrode relative to the pipe electrode, one can control which voltage level the burner is to operate with.

The focussing of interest in recent times on the working environment has revealed that the auxiliary means which exists for opening melting surfaces is insufficient. The different types of known auxiliary means can be summed up as follows:

Pneumatic drills can only be used when the tap hole has a limited depth and is employed with moderate temperatures. With a plasma burner according to the invention, high temperatures in the tap hole will not be any limitation.

Electrical burner pins consist as a rule of a graphite electrode which is connected to the electrical system of the furnace. However, it will be impossible to burn holes having a limited diameter and with sufficient depth with this type of equipment. In addition, the material which is to be burned away must always be sufficiently electrically conducting, something which, in practice, does not always appear to be the case.

Oxygen blowing is effected most often by blowing oxygen through a thin iron or steel pipe which is inserted in the tap hole. Compared with the plasma burners according to the invention a red-hot and burning oxygen pipe gives poor control of dimensions and direction of the tap hole.

Blasting with zinc balls is certainly first and foremost suited to a clean tap hole. The effect is obtained due to the zinc ball vaporising spontaneously within the tap hole. This involves the tap hole having to have a certain depth and high temperature before the technique can be used. The risk of ricochets is significant.

It has been found that a plasma burner according to the invention can be used for this purpose. Particularly in the transfer of heat to melts having a relatively high melt or softening temperature, the new plasma burners will be well suited.

For electrically conducting materials mainly electric arc heating/resistance heating or inductive heating are used. In common for these types of equipment, however, is that separate furnace equipment is required which is expensive to purchase and operate, is space-consuming and will have a relatively poor flexibility in handling varying melt volumes.

Overheating of the melt phase from the furnace so as to give this an excess of latent heat will often influence the operation of the process in an unfavourable manner. The possibility of carrying out the desired chemical reactions at optimum temperature conditions is reduced.

Gas burners are also employed but these will have a relatively rapidly diminishing thermal efficiency at increasing temperatures of the melt when traditional fuels are used.

In addition to the purely technical apparatus and energy advantages which can be achieved with the present plasma burners, it is also possible to carry out a series of melt metallurgical operations with better yields than is possible with other heat-retaining equipment.

In particular, the combination of heat-retention and blowing in of gas and solid particles with the described plasma burners will be able to provide conditions for chemical reactions between solid phase and melt phase, between gas/melt phase or between melted phases mutually. The reason for this situation lies in the control of temperature and stirring conditions of the melt so that the chemical reactions go much more rapidly than in the conventional process.

BRIEF DESCRIPTION OF THE DRAWINGS

In order that the invention can be more clearly understood, a preferred embodiment thereof will not be described, by way of example, with reference to the accompanying drawings in which.

DESCRIPTION OF THE PREFERRED EMBODIMENT

Figure 1:
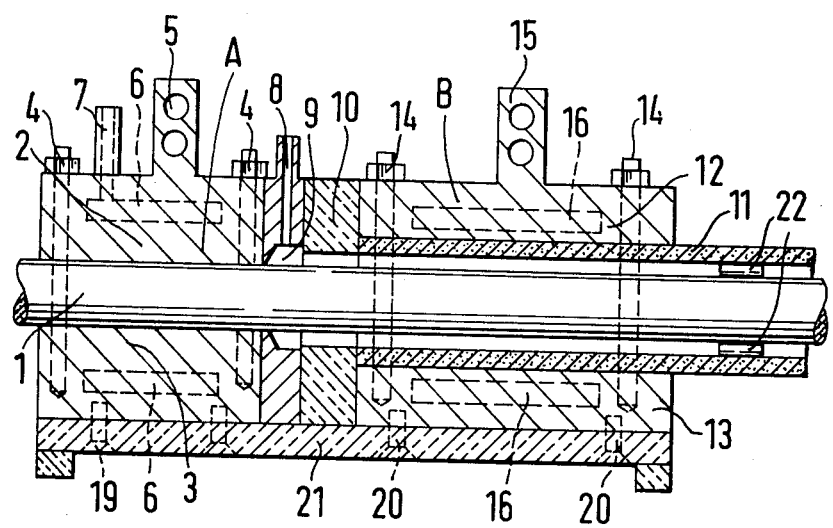
FIG. 1 is a sectional elevation of a plasma burner with consumable electrodes in which the contact and fastening means (A,B) of each electrode consists of two halves between which the electrode is mounted by pressing the two halves together by means of threaded bolts.
Figure 2:
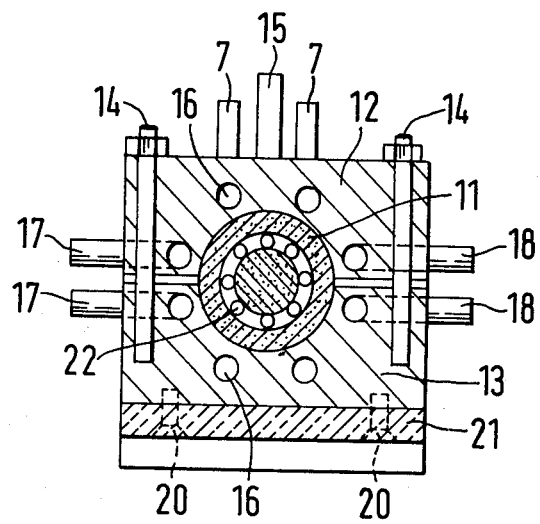
FIG. 2 is a section through the electrode holder of FIG. 1.

Referring to FIGS. 1 and 2, a plasma burner has a rod electrode 1 composed of graphite and having a diameter of 30 mm fastened in a contact means A consisting of an upper contact member 2 and a lower contact member 3 which are screwed together by means of two pairs of threaded bolts 4. Viewed in section at right angles to the longitudinal axis of the plasma burner, the recess in the upper (or lower) contact member is formed as a segment of a circle of 30 mm diameter and with a centre 1 mm below (or above) the under side of the contact member (or the upper side). This design of the contact means makes it possible to achieve good electrical contact with stable centering of the rod electrode without demanding disproportionately great precision in the manufacture of the electrode.

The upper contact member 2 is provided with a contact rail 5 for coupling current cables, in this instance two parallel welding cables of standard type designed for 500 A. The electrically conducting connection between the upper and lower contact members is established via the bolts 4.

Both contact members are provided with four longitudinal series-coupled ducts 6 for water cooling together with inlet and outlet pipes 7 for the cooling water (only one pipe shown in FIG. 1).

The necessary gas (typically 25–250 Nl/min.) for the operation of the plasma burner is led via a duct 8 through the upper contact member 2 into an annular shaped space 9 situated around the rod electrode, formed by the previously mentioned recesses in the contact members 2 and 3 being widened at the one end. The purpose of the space 9 is to obtain a more uniform distribution of the gas flow between the rod and pipe electrodes.

The contact means (A) for the rod electrode is electrically insulated from the corresponding means (B) for the pipe electrode by means of an insulating plate 10 made of a suitable heat-durable insulation material, for example, "Syndanyo" or "Marinite". Between the rod electrode and the insulating plate is a relatively narrow, annular column through which the gas with possible powder addition is able to pass.

If the plasma burner is to be employed for the injection of pulverous material, for example, in a metal melt for removing contaminants or supplying alloy elements, or in connection with opening tap holes in order to lower the melting temperature of the fire-resistant material, the powder can be supplied together with the gas through the duct 8 and transported pneumatically through the electrode holder and out between the electrodes.

The outer electrode is a graphite pipe 11 having an inner diameter of 40 mm. and an outer diameter of 60 mm.

The contact means B for the pipe electrode is constructed according to the same principles as the aforementioned contact means for the rod electrode, and thus consists of an upper contact member 12 and a lower contact member 13 joined together with two pairs of bolts 14. Further, the contact means is provided with a contact rail 15, cooling ducts 16 together with inlet and output pipes 17,18 for cooling water. The recesses of the contact members 12 and 13 are adapted to the outer diameter of the pipe electrode.

The contact means A,B for the rod electrode 1 and the pipe electrode 11 respectively together with the intermediate insulating plate 10 are fastened by means of two pairs of screws 19 and 20 respectively, to a stable base plate 21 made of a mechanically solid insulating material. The holes in the plate for the screws 19 are made somewhat larger than these so that the contact means A is able to be adjusted somewhat relative to the contact means B in order to obtain accurate centering of the electrodes.

If the plasma burner is to be used for a purpose which requires relatively long electrodes and then especially on operating in a horizontal position, or where it is appropriate to work with relatively small radial electrode distances, it is advantageous with respect to centering to place a suitable number of short, relatively thin-walled pipe pieces 22 in between the electrodes about 10-20 cm. from the open end (for example 20-21 pipes with outer diameters of 4.5-5 mm and lengths about 15 mm between a rod electrode with a diameter of 30 mm and a pipe electrode with an inner diameter of 40 mm).

Practical tests with centering means in the form of pipes made of high melting ceramic material, for example "Pythagoras" or "Alumina", reveal that the pipes vaporise without causing serious operational disturbances when the distance from the pipes forward to the electric arc is sufficiently short as a consequence of the eating away of the electrode. Spacers of boron nitrile have proved to be especially well suited.

If the burner is to work submerged in a metal melt, the excess pressure in the electrode holder must be at least as large as the hydrostatic pressure in the melt, for example, min. 0.7 bar at 1 mm immersion in an iron melt. In order to avoid too large gas leaks, suitable packings can be disposed between the contact members 2 and 3 and 12 and 13 respectively, and between the insulating plate 10 and the contact means A and B. Further, there can be employed an especially dense quality of graphite and, if desired, an especially thick material in the pipe electrode in order to reduce the gas diffusion through the pipe wall, if one does not desire gas generation from the electrode surface.

A prototype for alternating current operation has the following dimensions and typical operational data:

| | |
|---|---|
| Rod electrode diameter | 30mm |
| Pipe electrode inner diameter | 40mm |
| Pipe electrode outer diameter | 60mm |
| Electrode length | 900mm |
| Current Source: | |
| two series coupled transformators | |
| max. current strength: ca, | 1500A |
| no-load voltage | 180V |

| Gas Type | Argon | Nitrogen |
|---|---|---|
| Gas Supply | 25 Nl/min | 150-200 Nl/min |
| Current Strength | 1200A | 890A |
| Voltage | 51V | 112V |
| cos o | 0.97 | 0.94 |
| Pressure effect ($P_{tot.}$) | 59kW | 94kW |
| Energy development ($P_{el.}$) | 20kW | 12kW |
| Cooling Water Loss | 5kW | 4kW |
| Electric Arc energy ($P_{elec. arc}$) | 34kW | 78kW |
| Thermal efficiency | | |
| Min: 100 $P_{elec. arc}/P_{tot.}$ | 58% | 83% |
| Max: 100 $P_{elec. arc}/P_{tot.}$ | 92% | 96% |

Since a smaller or larger proportion of the ohmic heat generation $P_{el.}$ in the electrodes for certain applications must be regarded as a useless effect, there is indicated a minimum and maximum value for the thermal efficiency. With increasing electrode length, the loss of cooling water will decrease somewhat at the same time as $P_{el.}$ will obviously increase proportionally with the electrode length under otherwise similar conditions. The efficiency of a given effect will always increase with the voltage.

Figure 3:
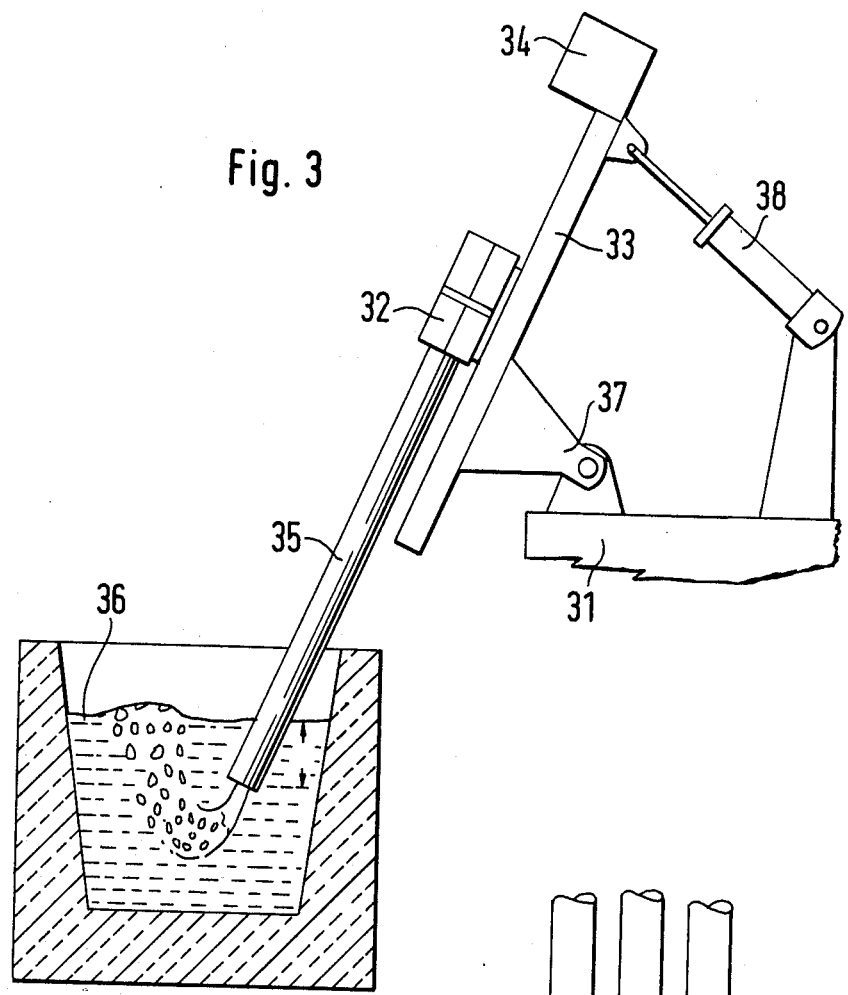
FIG. 3 is a representation, partly in section, of the plasma burner of FIG. 1 submerged in an electrically conducting fluid.

Referring to FIG. 3, the plasma burner is considered to be mounted in a stationary or mobile rig 31 constructed according to known principles, where the electrode holder can be moved up and down in a slide 33 by means of, for example, a spindle driven by a motor 34. In this way, the submerging H of the electrode system 35 in the metal melt 36 can be regulated. The inclination of the electrode system 35 can be adjusted by turning the slide 33 about the shaft 37 by means of, for example, a hydraulic cylinder 38. Current, gas and cooling water are supplied via cables and hoses. If desired, separate cooling water hoses can be avoided by employing water-cooled current cables.

Figure 4:
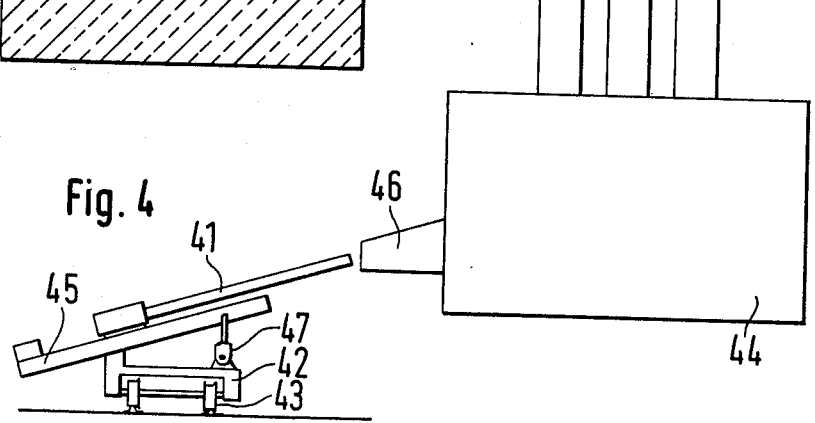
FIG. 4 is a representation of the plasma burner of FIG. 1 used for opening tap holes in an electrical melting furnace.

Referring to FIG. 4, the plasma burner 41 is considered mounted on a constructed rig 42 according to known principles, which can be moved along a track 43 so as to follow the slow rotating or oscillating movement of the furnace pot 44. By means of a slide and worm device 45 and a hydraulic cylinder 47 for adjusting the angle of inclination, the burner is controlled into the tap hole 46. The supply of current for the plasma burner can be stationary or mounted on the rig.

We claim:

1. Plasma burner comprising a centrally arranged electrode, an outer electrode and an electrode holder for the support of said electrodes, means for applying an electrical voltage for producing an electric arc between the electrodes and means for the supply of gas to the electric arc area of said electrodes, the electrodes being made of a non-melting and subliming material to constitute a continuously consumable system in which said outer electrode has the shape of a pipe and said centrally arranged electrode has a shape selected from that of a row and a pipe and is coaxially arranged within said outer electrode so as to define therebetween an elongate passage of annular cross-section, and said electrode holder being designed to conduct gas through said passage forwards to a front, free end of the electrodes where the electric discharge occurs from the end of said inner electrode.

2. The burner according to claim 1, wherein the electrodes are made of silicon carbide.

3. The burner according to claim 1, wherein the electrodes are made of graphite.

4. The burner according to claim 1, wherein the electrode holder comprises a front and rear, contact-forming holder member for the support of the outer and inner electrodes respectively, there being arranged between the holder members an electrically insulating plate and the holder members being fastened to an insulating support plate.

5. The burner according to claim 4, wherein each of the holder members is horizontally divided into two halves, the associated halves being provided with opposite part-cylindrical grooves having a radius which corresponds to the outer half diameter of the relevant electrode, and are secured to each other by means of fastening bolts.

6. The burner according to claim 4, wherein the holder member of the inner electrode is provided with an annular space situated around the inner electrode which via an annular passage in the insulating plate is connected to the passage between the electrodes and which can be connected to an outer gas source.

7. The burner according to claim 1, wherein the inner electrode is adapted to be able to be axially displaced relative to the outer electrode so as to regulate the axial distance between the free ends of the electrodes.

8. The burner according to claim 1, wherein the electrodes are centered relative to each other by means of a plurality of electrically insulating spacers which at a distance from the free end of the electrodes are distributed along the periphery of the inner electrode.

* * * * *